J. S. ALBUS 3,305,944

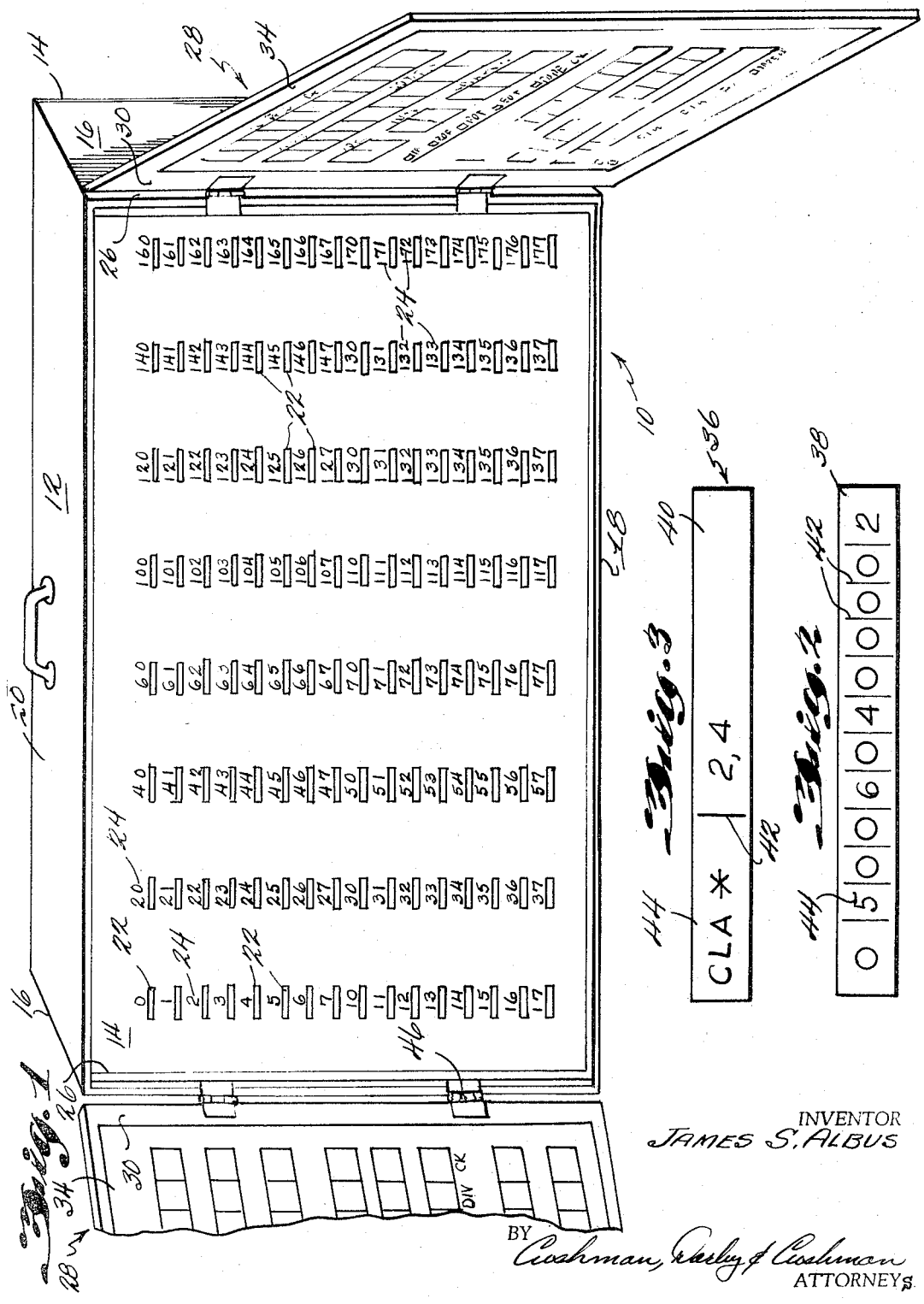

COMPUTER MODEL TEACHING AID

Filed Oct. 14, 1964

INVENTOR
JAMES S. ALBUS

BY Cushman, Darby & Cushman
ATTORNEYS

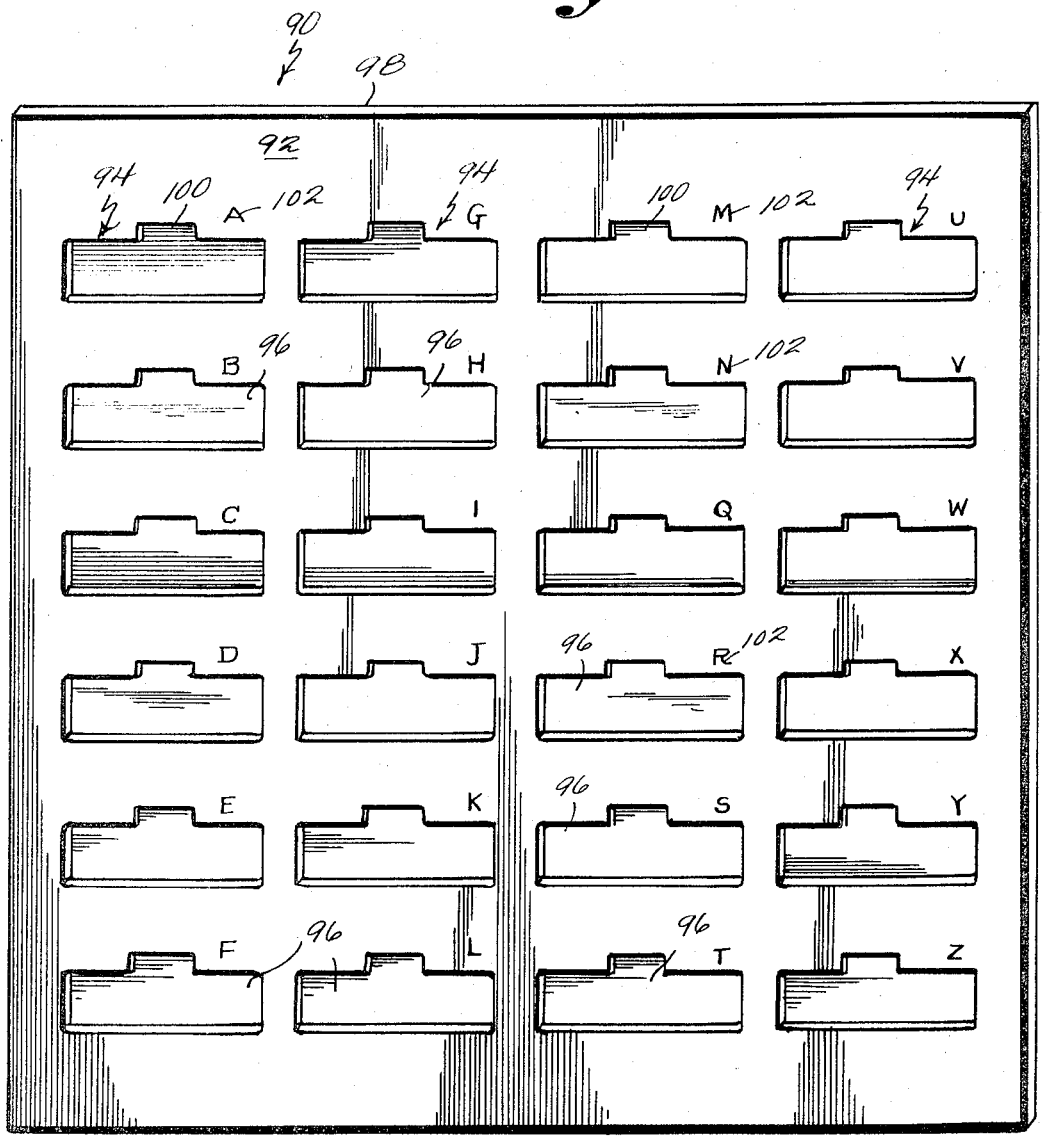

United States Patent Office 3,305,944
Patented Feb. 28, 1967

3,305,944
COMPUTER MODEL TEACHING AID
James S. Albus, Glen Dale, Md., assignor of forty percent to Robert M. Porter, Oxon Hill, Md.
Filed Oct. 14, 1964, Ser. No. 403,697
3 Claims. (Cl. 35—30)

This invention relates to a pedagogical aid and more particularly to a device by means of which principles of an operating computer such as programming and computer operation can be taught and illustrated.

Heretofore, certain methods of teaching operating computer principles were conducted, without the use of a physical model. This method was disadvantageous in that the student often failed to grasp most of the various isolated aspects of the computer or failed to visualize the internal operations of the computer. Further, while the student might have understood the mathematical processes involved in computer operations, it was found that often these processes had no real significance since they were not developed in the context of an entire computer system. Other methods which employed actual computers as models suffered from the disadvantage in that even simple computers, used as teaching models, were found to be expensive to operate and own and though some institutions might have been able to afford an operating computer as a teaching model very few of these could afford several different computers in order to demonstrate the differences existing in the operation of the various computers now in use.

It is therefore a principal object of the instant invention to overcome the disadvantages of prior methods employed to illustrate computer principles.

It is another object of the instant invention to provide means by which computer principles are easily illustrated.

Still another object of the instant invention is to provide a pedagogical device by which programming and computer operations are taught.

A further object of the instant invention is to provide a pedagogical device which is adaptable to illustrate computer principles associated with a plurality of commercially available operating computers.

A still further object of the instant invention is to provide a portable pedagogical device which is inexpensive to produce and easy to use and which is capable of demonstrating programming techniques and computer operations of varied operating computers.

Yet a further object of the instant invention is to provide a pedagogical device for teaching operating computer principles, which device comprises preferably a simulated memory unit, a simulated computer instruction means and a simulated computer computing unit, including simulated input or output units, which device can be employed to demonstrate, for instance, programming subtleties such as program interrupt, trapping and indexing, and which in all essential details corresponds to large computers.

These and various other objects, advantages and adaptations of the invention will become apparent from the following description taken with the appended drawings in which:

FIGURE 1 is a front elevational view of one embodiment of the instant invention;

FIGURE 2 is a top plan view of a simulated computer instruction means used in combination with the device shown in FIGURE 1;

FIGURE 3 is a bottom plan view of the computer instruction means shown in FIGURE 2;

FIGURE 4 is a front elevational view of the left-hand closure member of the device of the instant invention in the open position;

FIGURE 5 is a front elevational view of the right-hand closure member of the device of the instant invention in the open position;

FIGURE 8 is a front elevational view of a simulated memory unit used in combination with the computing unit shown in FIGURE 6; and FIGURE 9 is a perspective view of a simulated computer instruction means used with the units shown in FIGURES 6 and 8.

Figure 6:
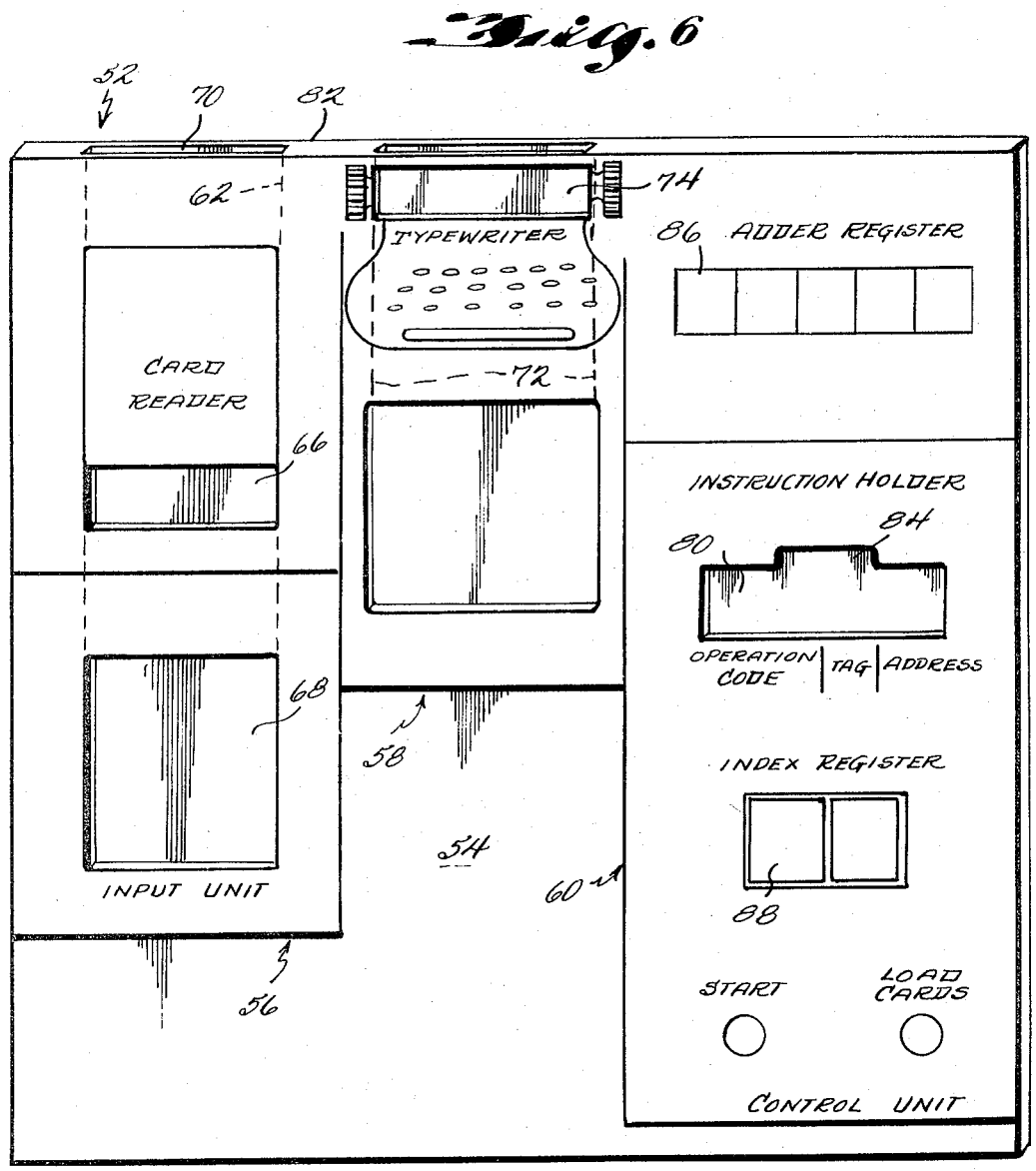
FIGURE 6 is a front elevational view of another embodiment of a simulated computing unit.

In FIGURE 1, there is shown a pedagogical device 10 for teaching operating computer principles comprising a simulated memory unit consisting essentially of a housing member 12 which, preferably, consists of a pair of side walls 14, end walls 16, bottom wall 18 and top wall 20.

One of said side walls 14 is provided with a plurality of vertically extending spacedly removed rows of longitudinally extending apertures 22, said apertures being spacedly removed from each other. Adjacent each aperture is an address 24, preferably, a number.

Pivotally mounted along the edge 26 formed by juncture of said side wall 14 with said end wall 16 is simulated computer computing unit 28 comprising, preferably, closure member 30 provided with an indicia face 32. Preferably, closure member 30 comprises a pair of pivotal members 34, each attached to said housing member 12 along said edges lying the same vertical plane. When pivoted to an open position, the indicia face 32 of said closure member 30 is exposed to view.

Removably stored in aperture 22 is simulated computer instruction means comprising longitudinally extending member 36 provided with indicia face on its obverse and reverse sides 38 and 40, respectively. Each of said obverse and reverse sides, preferably, are provided with at least one transversely extending ruling 42. More preferably, at least one of said obverse or reverse sides is provided with a plurality of said rulings 42, each being, preferably, equally spaced. The surface of said obverse and reverse sides, generally, is adaptable to removably receive written computer instruction, for example, numbers or letters 44. One of said sides 38 and 40, can be employed to designate in symbolic language the operation and operands to be stored initially, in the simulated memory unit. The other side can be employed to carry the same information translated into machine, i.e., computer language. Preferably, a plurality of simulated computer instruction means 36 are provided and each are insertable in any of the apertures 22. Advantageously, the sides 38 and 40 can be coated with blackboard paint or material so that they can be written upon with chalk.

Closure member 30 is, preferably, pivotally mounted to said housing member 12 by hinge means 46. The indicia face 32 of said closure member can be provided with a plurality of indicia receiving means 48 to removably receive indicia 50 representing various registers and indicators corresponding to those used in a particular computer. Since the various registers and indicators vary, depending on the manufacturer and/or type of computer, a plurality of sets of indicia 50 can be provided, each set corresponding to the particular computer being studied. Alternatively, indicia face 32 can be interchangeable with other indicia face corresponding to a different computer system. Advantageously, indicia face 32 is a blackboard and the areas representing the various registers and indicators can be permanently marked with paint.

In the operation of the teaching aid of this invention, the instructor or pupil writes the contents of the address on one side of the elongated member 36 in symbolic language. For instance, the address could read "add 125 to 400." Further, the address could contain information to have this sum appear in address 3 and that the fact that the next instruction is to be found in the contents of address 4. On the other side of the elongated member this symbolic language is transformed or translated into the format of machine language. Thus, the pupil can be taught how to translate the symbolic language into language employed by the machine. For instance, the term "add" can be translated or coded into a series of numbers based, for instance, on the binary, octal or sexadecimal system or any other convenient system, the choice of which will depend on a number of factors such as the particular computer being simulated by the instant device. The arguments, i.e., the numbers 125 and 400 can also be translated into machine language as well as any other instruction provided in symbolic language.

Accordingly, the other side of the elongated member 36 can carry, for instance, the following characters: "101 001 110 011," the first three digits, for instance representing the operation "add," the second three digits consisting the address of one operand or argument, etc.

On the indicia face 32 of the closure member, there can be inserted in the "Instruction Counter" box the figure "0," which indicates that at the beginning of the computer operation the contents of "0," address will initially be operated upon. Further, the indicia face 32 can be made to reflect, by the teacher or pupil, various information dependent on the stage of operation achieved in the simulated operation of a computer. For instance, if a particular channel such as "DC–A" is being utilized when instruction is given on a computer of the type with which such channels are associated, information such as the "location" of the stored data, the address being operated upon, the "end of tape," etc., can be physically inserted at the appropriate time by the student or teacher during the simulated operation of any type of computer.

In simulating the actual operation of a computer, the first argument, i.e., 125, will be transferred from the "memory" to the accumulator which in one computer system is identified with an arithmetic unit. There it is stored temporarily. The student then places the information found on the elongated member 36 in the appropriate position on the closure member 30 in the "Accumulator" column. While the first argument is being stored in the accumulator, the second argument, i.e., 400, can be transmitted to the accumulator. When the operation is performed, the result is formed in the accumulator before it is transmitted back to the "memory."

Thus, the result, namely, "525" would be formed and placed by the student in the accumulator, in computer language, for instance, 1000001101 which is based on the binary system. This information can then be placed by the student on the elongated member found in address 3. The student can also decode or translate this information to the other side of the member 36 in symbolic language.

Again, while any given instruction is being executed, it can be stored in a special memory cell called an "instruction register" which in one form of an operating computer is located in an instruction decoder which interprets an instruction. Generally, an instruction decoder constantly refers to the instruction being interpreted while control signals are being set up. The "instruction register" found on the closure member 30 will therefore reflect this instruction during this time. The student will then insert the proper instruction in this area in accordance with the instruction which is being interpreted at any given time.

As can be seen, the various functional areas of the computer represented on the closure member 30 will simulate the various stages of operation of an operating computer, thus enabling the student to fully comprehend not only the significance of the internal functioning of a computer but also the relationship of the coding or programming techniques with the computer operation.

Figures 4, 5:
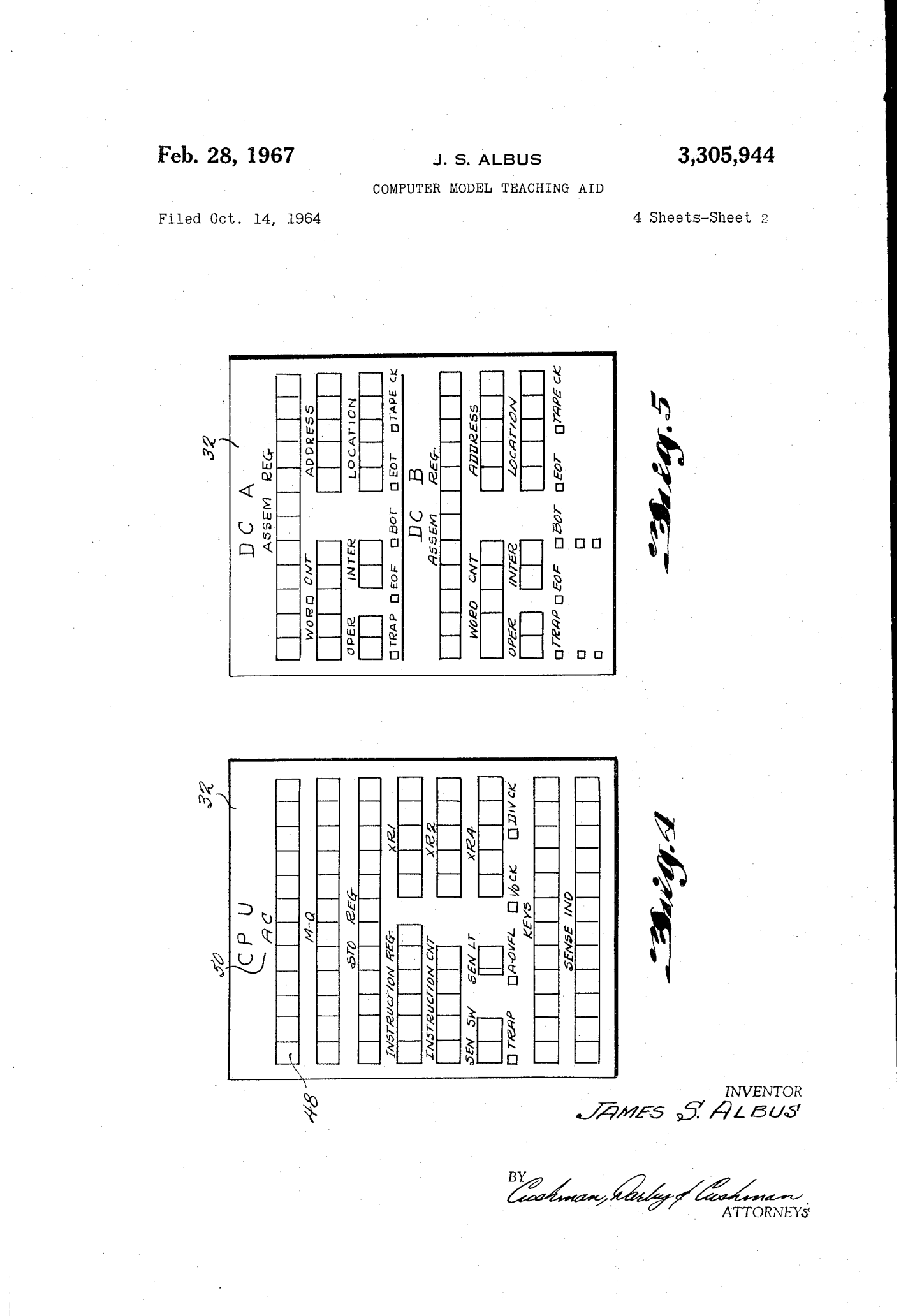
Figure 7:
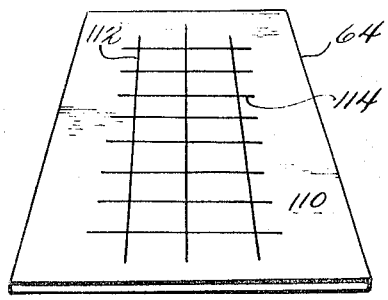
FIGURE 7 is a perspective view of a simulated input and output means used in the computing unit shown in FIGURE 6.

In another embodiment of the pedagogical device of the instant invention, as best seen in FIGURES 5–8, there is provided an educational game comprising a simulated computer computing unit board 52 which, in turn, is provided with an indicia face 54. Preferably, the board 52 includes input unit means 56, output unit means 58 and means 60 to removably receive operated computer instructions and simulated computer instruction means.

Input means 56 comprises, generally, elongated slot 62 substantially parallel to the major axis of the board 52. Slot 62 is adapted to removably receive an instruction or programming sheet 64, the face 54 being provided with a pair of spacedly removed windows 66 and 68. Slot 62 has a width preferably slightly larger than the width of said instruction sheet 64 to facilitate insertion therein, passage therethrough and removal therefrom at slot 70 provided at the upper edge face of the board 52. Window 66 provides concentrated visual attention to that portion of the programming sheet appearing thereunder and demarcates the information which should be placed in the simulated memory unit.

Output unit means 58 also comprises, generally, elongated slot 72 substantially parallel to the major axis of the board 52. Slot 72 is also adapted to removably receive readout sheet (not shown) which is substantially similar in construction to programming sheet 64. A description of one will suffice for both. The output unit means 58 is provided with a pair of spacedly removed windows 74 and 76. Slot 72 has a width substantially the same as slot 62 and for essentially the same purpose. Window 74 also provides concentrated visual attention to that portion of the readout sheet appearing thereunder and demarcates the area where the instructions to be read out are written.

Means 60 to removably receive simulated computer instruction means 78 comprises a shallow aperture 80 in the indicia face 54 bounded by the reverse face 82 of the board 52. Advantageously, one edge of the indicia face 54 forming a peripheral limit of the aperture is provided with a finger receiving recess 84, to facilitate removal of simulated computer instruction means 78 therefrom. Means 60 also includes indicia areas 86 and 88 to removably receive operated computer instructions.

In FIGURE 8, there is shown a simulated memory unit board 90 which is provided with an indicia face 92, said face being provided with a plurality of spacedly removed rows 94 of spacedly removed shallow apertures 96. The apertures 96 are bounded by the reverse face 98 of the board 90. Advantageously, also, one edge of the indicia face 92 forming a peripheral limit of the aperture is provided with a finger receiving recess 100 to facilitate removal of simulated computer instruction means 78 therefrom. Adjacent each aperture is an address 102, preferably a letter or a number.

Removably stored in apertures 96 is simulated computer instruction means 78 comprising elongated members 104 provided with an indicia face 106. The indicia face, preferably, is provided with at least one transversely extending ruling 108. More preferably, a plurality of such rulings are provided, each being advantageously equally spaced. The surface of the indicia face, generally, is adaptable to removably receive written computer instructions, for example, numbers or letters. Preferably, a plurality of simulated computer instruction means 78 are provided.

Removably received in input means 56 and output means 58 is elongated instruction sheet 64 and readout sheet. These sheets are substantially identical and the description of the instruction sheet only will suffice. Instruction sheet 64 is provided with an indicia face 110 carrying a plurality of longitudinal rulings 112 and transverse rulings 114, the indicia face 110 adaptable to receive instructions, i.e., program information or readout information as the case may be.

The boards 52 and 88 can be provided separately or they can be combined into a unitary board, to lie flat or adapted to be folded. Preferably, the boards are fabricated from plastic as are the simulated computer instruction means 78 and the instruction and readout sheets. A grease pencil can be used to removably write information on these component parts as well as on the indicia faces of the boards.

The operation of this embodiment is similar to that already described, although a variation exists in the method of simulating (1) the introduction of information to and (2) the reading out of information from the simulated computer. For instance, in each of the rows of spaces bounded by longitudinal and transverse rulings 112 and 114, respectively, of the instruction sheet 64, a list of instructions are written and the sheet is inserted in the elongated slot 62 until the first row is visible in the window 66. This action simulates loading an actual computer with "Load Cards." The information visible in slot 62 is then transferred onto an appropriate simulated computer instruction means 78 and stored in the appropriate shallow aperture 96. This operation is continued until all instructions appearing on the sheet 64 are transferred and stored in the memory unit board 90. Once the information has been fed to the simulated memory unit board 90, the operation heretofore described is carried out.

In reading out the simulated computer, there is initially an instruction written on the instruction sheet 64 and placed in the simulated memory unit board 90. This information will direct the operator to write on the readout sheet on its indicia face visible in window 74, the sheet having been inserted in the slot 72, the result of a computation performed. Unless an instruction has been fed to the simulated computer to perform other computations, the readout will generally terminate the operation and usually such an instruction is provided to the simulated memory unit from the programming sheet 64 of the input means 56.

It is to be understood that the description given above is intended to illustrate the best embodiment of the invention and that it should be apparent that many modifications thereof will occur to those skilled in the art which fall within the scope of the following claims.

It is claimed:

1. A pedagogical device for teaching operating computer principles comprising a simulated memory unit consisting essentially of a housing member provided with a plurality of apertures to removably store simulated computer instruction means, said simulated computer instruction means comprising a member provided with at least one indicia face and simulated computer computing unit comprising a housing closure member provided with removably attached indicia face adaptable to removably receive indicia corresponding to operated computer instructions.

2. A pedagogical device for teaching operating computer principles comprising a simulated memory unit consisting essentially of a housing member having a side wall provided with a plurality of apertures adaptable to removably store simulated computer instruction means, said instruction means comprising a longitudinally extending member provided with indicia faces on the obverse and reverse sides thereof and a simulated computer computing unit comprising a housing closure member provided with removably attached indicia face adaptable to removably receive indicia corresponding to operated computer instructions, said closure member being pivotally mounted on said housing to expose said side wall and said closure indicia face on pivoting.

3. A portable pedagogical device for teaching operating computer principles comprising a simulated memory unit consisting essentially of a housing member having a side wall provided with a plurality of apertures adaptable to removably store simulated computer instruction means, said plurality of apertures being arranged in a plurality of vertically extending rows, each of said apertures provided with an address, said simulated computer instruction means comprising a longitudinally extending member having an obverse and reverse side, said sides provided with a plurality of rulings extending transverse to the longitudinal axis of said member and a simulated computer computing unit comprising a housing closure member provided with removably attached indicia face adaptable to removably receive indicia corresponding to operated computer instruction, said closure member being pivotally mounted on said housing to expose said side wall and said closure indicia face on pivoting.

References Cited by the Examiner

UNITED STATES PATENTS 3,026,036   3/1962   Haanstra et al. _____ 235—157
3,162,960   12/1964  Elminger _____ 35—30

OTHER REFERENCES

"Digital Computer Fundamentals," by T. C. Bartee, published in 1960 by McGraw-Hill Book Company, Inc., pages 22–25 relied upon.

EUGENE R. CAPOZIO, *Primary Examiner.*

S. M. BENDER, *Assistant Examiner.*